(12) United States Patent
Saes

(10) Patent No.: US 12,033,547 B2
(45) Date of Patent: Jul. 9, 2024

(54) METHOD OF OPERATING A DISTRIBUTED LIGHT SOURCE FOR DISPLAYING MOVING IMAGES AND DISTRIBUTED LIGHT SOURCE

(71) Applicant: EldoLAB Holding B.V., Son en Breugel (NL)

(72) Inventor: Marc Saes, Eindhoven (NL)

(73) Assignee: eldoLAB Holding B.V., Son en Breugel (NL)

( * ) Notice: Subject to any disclaimer, the term of this patent is extended or adjusted under 35 U.S.C. 154(b) by 0 days.

(21) Appl. No.: 16/761,088

(22) PCT Filed: Nov. 8, 2018

(86) PCT No.: PCT/NL2018/050744
§ 371 (c)(1),
(2) Date: May 1, 2020

(87) PCT Pub. No.: WO2019/093888
PCT Pub. Date: May 16, 2019

(65) Prior Publication Data
US 2020/0357315 A1    Nov. 12, 2020

(30) Foreign Application Priority Data
Nov. 8, 2017  (NL) .................... 2019867

(51) Int. Cl.
*G06F 3/041* (2006.01)
*G09G 3/00* (2006.01)
(Continued)

(52) U.S. Cl.
CPC ............. *G09G 3/001* (2013.01); *G09G 3/005* (2013.01); *H05B 45/44* (2020.01); *H05B 47/155* (2020.01); *G09G 2370/00* (2013.01)

(58) Field of Classification Search
CPC .. H01M 10/045; H01M 10/052; H01M 10/20; H01M 10/36; H01M 2300/0002;
(Continued)

(56) References Cited

U.S. PATENT DOCUMENTS 9,485,813 B1 * 11/2016 Lewis .................... H05B 45/20
2003/0057886 A1   3/2003 Lys et al.
(Continued)

FOREIGN PATENT DOCUMENTS

JP    2002311881 A    10/2002
WO    2007147638 A1   12/2007
WO    2011053132 A2    5/2011

OTHER PUBLICATIONS

Written Opinion for International Application No. PCT/NL2018/050744, dated Jan. 23, 2019, 7 pages.
(Continued)

*Primary Examiner* — Jonathan M Blancha
(74) *Attorney, Agent, or Firm* — Buchanan Ingersoll & Rooney PC

(57) ABSTRACT

A method of operating a distributed light source and a distributed light source are disclosed. The distributed light source comprising a plurality of light sources to display an image, the method comprising the steps of:
  transmitting the image to be displayed to the plurality of light sources, the image being described in an image coordinate system;
  providing to each of the light sources information indicative of a position of the light source in the image;
  determining, by each of the light sources, an illumination set point for the light source, based on the position information and the transmitted image, and
(Continued)

controlling the plurality of light sources to generate an illumination in accordance with the respective plurality of illumination set points, thereby displaying the image.

19 Claims, 6 Drawing Sheets

(51) Int. Cl.
*H05B 45/44* (2020.01)
*H05B 47/155* (2020.01)

(58) Field of Classification Search
CPC .......... H01M 4/366; H01M 4/38; H01M 4/42; H01M 4/505; H01M 50/20; H02J 7/0013; Y02E 60/10; G06F 3/1446; G09G 2370/00; G09G 3/001; G09G 3/002; G09G 3/003; G09G 3/005; H05B 45/44; H05B 47/155
USPC ........................................................ 345/694
See application file for complete search history.

(56) References Cited

U.S. PATENT DOCUMENTS

| | | | |
|---|---|---|---|
| 2004/0008155 A1* | 1/2004 | Cok | G06F 3/1446 345/1.3 |
| 2005/0116667 A1* | 6/2005 | Mueller | E04F 15/02 315/312 |
| 2005/0151941 A1 | 7/2005 | Solomon | |
| 2009/0322649 A1 | 12/2009 | Hamer et al. | |
| 2011/0035404 A1 | 2/2011 | Morgan et al. | |
| 2015/0035440 A1 | 2/2015 | Spero | |
| 2017/0192733 A1* | 7/2017 | Huang | G06F 3/1446 |

OTHER PUBLICATIONS

Netherlands Search Report for Netherlands Application No. NL2019867, dated Jun. 27, 2018, 10 pages.

* cited by examiner

METHOD OF OPERATING A DISTRIBUTED LIGHT SOURCE FOR DISPLAYING MOVING IMAGES AND DISTRIBUTED LIGHT SOURCE

RELATED APPLICATIONS

This application is a U.S. National Phase Patent Application of International Application No. PCT/NL2018/050744, filed Nov. 8, 2018, which claims priority to Netherlands Application No. NL 2019867, filed Nov. 8, 2017, the disclosures of which are entirely incorporated herein by reference.

FIELD OF THE INVENTION

The invention relates to the field of distributed light sources and more specifically to the field of LED based distributed light sources that are used for displaying light shows or the like.

BACKGROUND OF THE INVENTION

At present, light source installations comprising a plurality of individually addressable or controllable light sources, also referred to as distributed light sources such as LED based distributed light sources, may e.g. be used for displaying colored images or light shows on outer walls of buildings. Such distributed light sources may e.g. comprise a plurality of light sources, e.g. arranged in a rectangular grid. In order to generate a light show, the desired intensity or color or both of each of the light sources may need to be updated at a comparatively high frequency, in order to generate a smooth transition between consecutive images of the displayed light pattern. As a consequence, the operation of such a distributed light source, e.g. a plurality of different light sources e.g. LEDs on a wall of a building, may require a comparatively high bandwidth for the communication of the desired illumination characteristics to the plurality of light sources, in particular in case the light sources are used for generating moving images. In addition, the individually controllable light sources of such a light source installation may be spaced apart over comparatively large distances. Often, a high bandwidth and a comparatively large installation do not combine very well. Communication with such a distributed light source installation may require using network communication having a comparatively long range. Typically, such networks may have a comparatively low bandwidth and tend to further limit bandwidth to save on battery power.

SUMMARY OF THE INVENTION

It would be desirable to provide in a distributed light source that is capable of displaying moving images by the distributed light source without the need of a high bandwidth transmission of illumination set points for the distributed light source.
As such, it is an objective of the present invention to operate such a distribution light source as dynamically as possible, i.e. to generate moving images as dynamically as possible, even when the available bandwidth for communication to the light sources is comparatively small.

In an embodiment of the present invention, there is provided a method of operating a distributed light source comprising a plurality of light sources to display an image, the method comprising the steps of:

transmitting the image to be displayed to the plurality of light sources;

storing, by each of the plurality of light sources, at least a portion of the image;

providing, to each of the plurality of light sources, position information indicative of a position of the respective light source in the portion of the image;

determining, by each of the light sources, an illumination set point for the respective light source, based on the position information and the portion of the image; and controlling the plurality of light sources to generate an illumination in accordance with the respective plurality of illumination set points, thereby displaying the image.

In accordance with the present invention, a distributed light source may e.g. comprise a plurality of light sources, e.g. LED light sources that are distributed in a plane or across a surface or in a volume.

In order for the distributed light source to generate an image, i.e. a particular light distribution, e.g. including intensity or color variations, the image or part thereof is transmitted and stored in the plurality of light sources.

In accordance with the present invention, each light source is further provided with position information indicating its position in the image or portion of the image. Within the meaning of the present invention, position information indicating a position of a light source in an image or a portion of an image does not refer to an actual physical location or position of a light source, nor does it refer to a relative position of a particular light source in the distributed light source. Rather, it refers directly to the position of a dot or pixel or point in the image of which characteristics such as intensity and/or color are to be generated by the particular light source. Therefore, wherever in the following reference is made to a position of a light source in an image or a portion of an image, this has to be understood as a position of a dot or pixel or point in the image of which characteristics such as intensity and/or color are to be generated by the light source. In an embodiment, an image may e.g. be represented in an image coordinate system (i, j), e.g. a two-dimensional matrix, whereby each matrix element each coordinate (i, j) indicates a desired intensity and/or color to be generated at a particular location in the image. In case such an image is transmitted and stored in the light sources, the required position information to be provided to each of the light sources is merely a coordinate pair (i, j) indicative of the light source's position in the image. As will be understood, providing each of the light sources with the appropriate position information indicative of the position of the light source in the image implies knowledge of the actual physical location of the light sources, e.g. an absolute position, in the distributed light source, or a relative position of each of the light sources. Such knowledge can e.g. be available in a control unit or central control unit controlling the distributed light source. Such position information on the relative or absolute position of the light sources of the distributed light source can e.g. be expressed in a different coordinate system than the image coordinate system. Such coordinate system may e.g. be referred to as a light source coordinate system.

In another embodiment of the present invention, there is provided a distributed light source configured to display an image, the distributed light source comprising:

a central control unit and, a plurality of light sources, each of the plurality of light sources comprises:

an LED assembly comprising one or more LEDs;
a power converter configured to power the LED fixture;
a control unit comprising a memory unit and a processing unit, the control unit being configured to:
receive an image signal representing at least part of the image to be displayed from the central control unit and store it in the memory unit;
receive position information indicative of a position of the respective light source in the at least part of the image to be displayed, from the central control unit;
determine an illumination set point for the respective light source, based on the position information and the transmitted at least part of the image, and
control the respective light source to generate an illumination in accordance with the respective illumination set point.

In an embodiment, the distributed light source according to the present invention enables, as will be detailed below, to generate images and sequences of images without the requirement of transmitting a sequence of images to the different light sources of the distributed light source. Rather, using the distributed light source according to the present invention, only position information indicating a position or a sequence of positions in the image needs to be transmitted by the central control unit to the different light sources.

In a further embodiment, a sequence of images to be displayed may however be transmitted to the light sources, e.g. by means of broadcasting, and stored by the light sources. In order to subsequently display the sequence of images, the plurality of light sources need only be provided with position information indicating their position in the sequence of images during a displaying of the sequence of images. Such a distributed light source may be configured to perform the following method:

In an embodiment, the present invention provides in a method of operating a distributed light source comprising a plurality of light sources to display a sequence of images, the method comprising the steps of:
transmitting the sequence of images to be displayed to the plurality of light sources;
storing, by each of the plurality of light sources, at least a portion of the sequence of images;
providing, to each of the plurality of light sources, position information indicative of a position of the respective light source in the portion of the sequence of images during a displaying of the sequence of images;
determining, by each of the light sources, an illumination set point for the respective light source for the sequence of images, based on the position information and the portion of the image; and
controlling the plurality of light sources to generate an illumination in accordance with the respective plurality of illumination set points, thereby displaying the sequence of images.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
FIG. 1 depicts an example image to be displayed by a distributed light source.

FIG. 1 schematically depicts an image 100 that is to be displayed by a distributed light source. The image 100 may e.g. be described in an image coordinate system (i, j) represented by the axis I and J. This may e.g. be done in a discrete manner, whereby each coordinate pair (i, j) is given a representative value, e.g. representing a color and/or intensity of the image at said coordinate pair. The image 100 may e.g. comprise n×m pixels, each having a particular color and intensity to be imaged. Note that in case of a three-dimensional image, the image may be characterized by attributing a desired illumination value to a coordinate triplet (i, j, k) rather than a coordinate pair. In general, a coordinate pair or triplet is referred to, within the meaning of the present invention, as a coordinate set.

Figure 2:
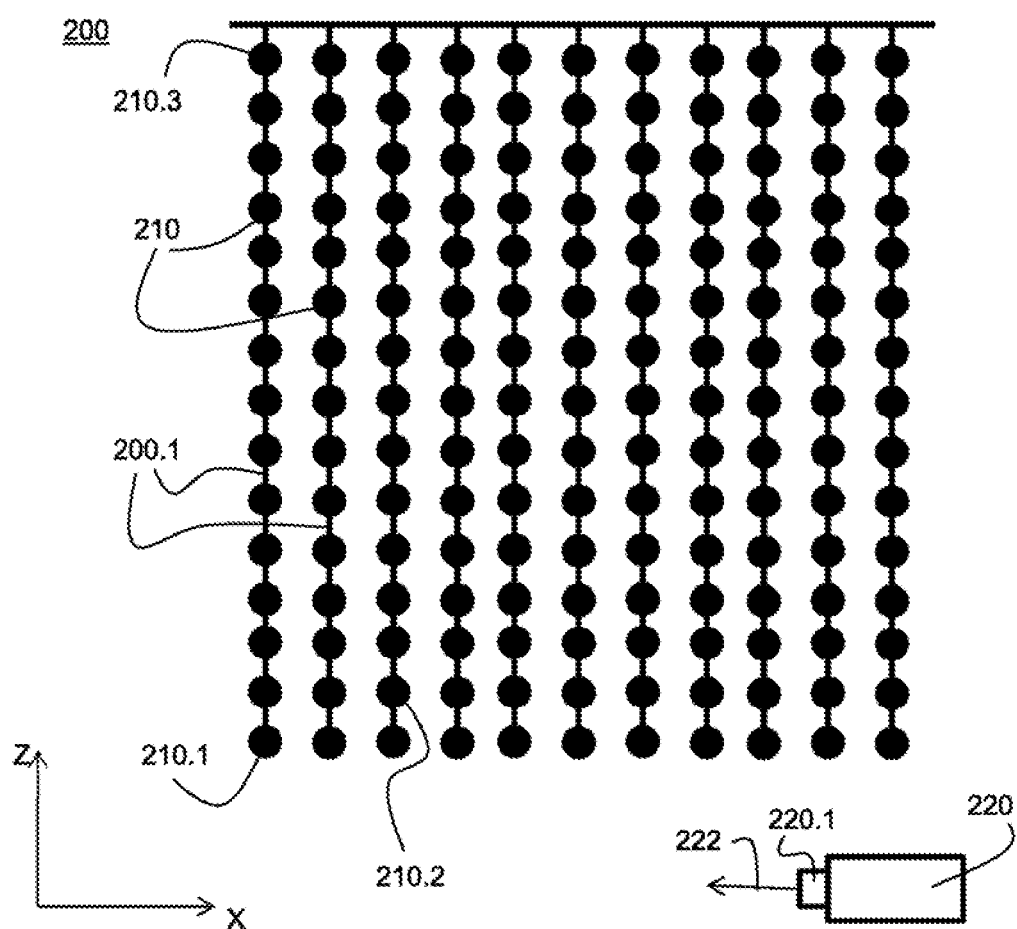
FIG. 2 depicts a distributed light source according to an embodiment of the present invention.

FIG. 2 schematically depicts a distributed light source 200, comprising a plurality of light sources 210. In the embodiment as shown, the distributed light source 200 comprises a plurality of vertical strings 200.1 arranged adjacent each other in a horizontal direction, each string comprising a plurality of light sources 210. Such a light source may e.g. be mounted to a wall of a building. Such a distributed light source 200 may e.g. further comprise a control unit 220 for controlling the plurality of light sources 210. In an embodiment of the present invention, the control unit 220 may e.g. comprise an output terminal 220.1 for outputting control signals or set points 222 for the plurality of light sources 210 of the distributed light source. As the light sources 210 may also include a control unit for controlling the generated illumination, the control unit 220 may also be referred to as a central control unit 220 of the distributed light source 200.

Within the meaning of the present invention, a distributed light source refers to a light source that comprises a plurality of discrete light sources. Such a distributed light source need not be limited to a two-dimensional arrangement of light sources, a one-dimensional array of light sources may be considered as well. In an embodiment, such a one-dimensional array of light sources may be arranged, e.g. draped, in a two-dimensional or even three-dimensional manner. Further, the distributed light source according to the present invention may comprise a three-dimensional arrangement of light sources (e.g. a plurality of light sources arranged in a Christmas tree) may be considered a distributed light source as well.

In addition, the relative position of the light sources of such a distributed light source need not be the same nor constant over time. In particular, the plurality of light sources of the distributed light sources may be displaceable relative to each other. As an example of such a distributed light source, a plurality of drones, each provided with a controllable light source, can be mentioned.

In case such a distributed light source 200 would be used to display the image as shown in FIG. 1, the control unit 220 of the distributed light source 200 could e.g., based on the image, transmit to each of the light sources 210, e.g. via the output terminal 220.1, a desired illumination set point 222, representing a required color and intensity so as to display the image.

In case the distributed light source is to be used to display a moving or varying image, such a moving or varying image may be generated by transmitting, to each of the light sources 210 of the distributed light source 200, a sequence of desired illumination set points required to generate the moving or varying image.

Note that these methods of generating a desired illumination pattern or image or a sequence of images implies that the central control unit can address each light source individually and knows a relative position of the light sources in the distributed light source. In particular, to assign the appropriate illumination set point, the central control unit 220 should know that light source 210.1 is located in the lower left corner and that light source 210.3 is located in the upper left corner, and so on.

The transmission of such a sequence of illumination set points to each of the light sources may however require a comparatively high bandwidth, in particular in case the resolution with respect to intensity and or color is comparatively high.

In order to mitigate this, the present invention provides in an alternative manner of displaying an image by a distributed light source.

In accordance with an embodiment of the present invention, an image that is to be displayed by a distributed light source that comprises a plurality of light sources, is transmitted or uploaded to the plurality of light sources. In an embodiment, the entire image to the displayed is transmitted to each of the light sources, e.g. by means of broadcasting, whereupon, each light source stores the image in a memory unit of the light source. Alternatively, each light source of the plurality of light sources may only receive and store a portion or part of the image that is to be displayed. As will be understood by the skilled person, in case each light source only receives a part or portion of the image, the control unit or central control unit which controls the transmission needs to be able to address the different light sources individually and be aware of the relative position of each light source, in order to provide each light source with the appropriate portion of the image.

In an embodiment of the present invention, the distributed light source is operated so as to display a sequence of images, e.g. to display a moving image, a movie or a light show. In an embodiment, such a sequence of images to be displayed may be uploaded or transmitted to the plurality of light sources. In an embodiment, the sequence of images may be stored in each of the light sources. Alternatively, each light source of the plurality of light sources may only receive and store a portion or part of the sequence of images that is to be displayed. In accordance with an embodiment of the present invention, the image to be displayed by the distributed light source, is uploaded or transmitted to each light source of the distributed light source. In such embodiment, each light source may e.g. be equipped with a memory module for storing the image, e.g. in a digital format.

In case a sequence of images is to be displayed, the central control unit may e.g. also provide, in addition to the sequence of images, an image ID (or frame ID) for each image, so as to allow identification of the images. The light sources may then subsequently controlled by providing a sequence of image or frame IDs to the light sources, in addition to the position information, e.g. coordinates of the light sources in the image coordinate system (i, j). In case of a video-like imaging, i.e. the generation of a sequence of images, the (i, j) coordinates will most likely be fixed and only the image ID would change throughout the sequence. But a mixed situation may also occur as indicated above.

With respect to the storage of a sequence of images or parts thereof, the same consideration with respect to individual addressability or knowledge about a relative position by the light sources as described above apply here as well.

Once the image has been stored, each of the light sources may be provided with position information indicating their position in the image. As an example, the image to be displayed may e.g. be stored in each of the light sources as a 2D matrix (e.g. n×m elements), each element of the matrix containing an intensity set point and a color set point.

When each light source is provided with position information on its position in the image, this position information may be used to look up, e.g. in the 2D matrix representing the image, the required intensity and color. As such, position information of a light source indicating the light source's position in an image refers to information that enables the light source, e.g. by means of a processing unit of the light source, to assess which part (e.g. which pixel) of the image it has to generate or display. In an embodiment, the position information enables such a processing unit to retrieve an illumination set-point from the transmitted or uploaded image or part of the image. When the required intensity and color are retrieved, this position information can be processed and applied by the light sources, in order to generate the image. In the present invention, the position information as provided to the light sources is referred to as position information indicating the light source's position in the image. Such position information is distinct from physical position information of the light source. The position information indicating a light source's position in the image may e.g. comprise a coordinate, coordinate pair or triplet which can be used by the light source to look up the required illumination set point using the image or part of the image that is stored. As mentioned above, in case of a sequence of images is provided to the light sources, each image or image portion may also include and image ID or frame ID.

It can be noted that, in order to generate the required position information indicating a light source's position in the image, the central control unit of the distributed light source needs to be aware of either the relative positions of the individual light sources or the actual positions of the light sources. Based on this information, the central control unit may determine, for each of the light sources, the required position information, e.g. coordinates of the light sources in the image, i.e. in the image coordinate system. Upon receipt of this position information, the light sources may then determine and generate the required illumination.

In order to enable this, each of the light sources of the distributed light source may comprise, in an embodiment of the present invention, a control unit (also referred to as a light source control unit), an LED assembly comprising one or more LEDs and a power converter. In such an embodiment, the light source control unit may e.g. comprise a processing module or processor and a memory module, whereby the memory module is configured to store an image as received by the light source control unit and the processing module is configured to determine the required intensity and color based on the image and the position information indicating the light source's position in the image. In such embodiment, the processing module may further be configured to control the power converter so as to provide the appropriate power to the light source, causing the light source to radiate light substantially conform the required intensity and color. In such embodiment, the power converter may e.g. be switched mode power converter such as a Buck, Boost, Buck-Boost or hysteretic power converter.

In an embodiment, of the present invention, each of the plurality of light sources stores only a part or a portion of the image that is to be displayed. In an embodiment, only those coordinates in an image that are actually used by a particular light source for illumination need to be transmitted to and stored by that particular light source.

In an embodiment, the distributed light source is operated in such manner that a moving image is generated. Such a moving image can be realized by applying a sequence of different illumination set-points by each of the plurality of light sources, the sequence e.g. representing the consecutive, different positions of the light source in the image to be displaced. Phrased differently, the moving image is realized by generating a sequence of images, the sequence of images e.g. comprising different positions of an image. In case the movement of the image is known beforehand, only those coordinates in an image that are actually required for generating the moving image need to be transmitted/stored. In such embodiment, each of the light sources of the distributed light source needs to know a part or portion of the image that is to be displayed. Such an operation may thus be described as a method of operating a distributed light source comprising a plurality of light sources to display a sequence of images, the method comprising the steps of:
- transmitting the sequence of images to be displayed to the plurality of light sources;
- storing, by each of the plurality of light sources, at least a portion of the sequence of images;
- providing, to each of the plurality of light sources, position information indicative of a position of the respective light source in the portion of the sequence of images during a displaying of the sequence of images;
- determining, by each of the light sources, an illumination set point for the respective light source for the sequence of images, based on the position information and the portion of the image; and
- controlling the plurality of light sources to generate an illumination in accordance with the respective plurality of illumination set points, thereby displaying the sequence of images.

Again, as discussed above, the position information as provided to the light sources and used by the light sources represents the position of the light sources in the image. The position information may e.g. express the position as coordinates in an image coordinate system.

Note that, in an embodiment, the resolution of an image or moving image that is to be displayed may be different from the available resolution of the distributed light source. An image may e.g. be represented by a 1000×1000 matrix of illumination set-points, whereas the distributed light source only has 100×100 light sources. In such case, only that part or portion of the image or moving image that can be realized need to be stored by the light sources of the plurality of light sources. This hold both for displaying a static image or a moving image. In the latter case, if only course movements of the image are needed, only a few coordinates need to be transmitted and stored. If a very fine-grained movement is targeted, more coordinates need to be transmitted and stored. Note that also the required movement of the image may determine which part of the image needs to be transmitted and stored. In case of a random displacement of modification of an image, the entire image may need to be stored, in the available resolution, in each of the plurality of light sources.

In an embodiment, the position information indicating the position of a light source in an image that is to be displayed may be a coordinate pair, in general a coordinate set, referring to the position of the light source in the 2D matrix representing the image. As will be understood by the skilled person, providing each light source with such a coordinate pair may require a much lower bandwidth than transmitting an intensity and color set point, since the amount of information or data is lower.

This can be made clear by the following example:

Assuming that an image is to be displayed, whereby the image can be represented by a 128×128 matrix I, each element of the matrix, identifiable by coordinate pair (i, j), i, j ranging from 0 to 127, containing information indicative of a desired intensity and color. Once this information is provided to each light source of the distributed light source, each light source only needs to be made aware of its coordinate pair (i, j) it needs to use in order for each light source to determine the required illumination characteristic. Phrased differently, each light source needs to be made aware of its position in the image that is to be displayed, e.g. its coordinates in a matrix representing the image. As such, in accordance with the operating method according to the present invention, each of the light sources is provided with position information indicative of a position of the light source in the image. Note that, in accordance with the present invention, the positions of the plurality of light sources, i.e. the physical location of the light sources may also be stored or represented in a matrix. In an embodiment, the physical locations of the plurality of light sources may be described in a light source coordinate system.

Based on information on the physical location or the relative position of the plurality of light sources and the image that needs to be displayed by these light sources, a control unit of the distributed light source may determine which image information needs to be provided to each of the plurality of light sources. It may be pointed out that various options exist to formulate such information, i.e. information indicative of a position of the light source in the image. As a first example, the coordinate pair of the matrix representing the image may be used. In the given example, the coordinate pair can be characterized by a pair of 7-bit numbers. With reference to FIG. 2, light source 210.1 may thus be made aware of its relative position by providing it with the coordinate pair (0, 0), while light source 210.2 may thus be made aware of its relative position by providing it with the coordinate pair (3, 2). In high resolution applications, e.g. known as high color (15/16 bit), true color (24-bit) or deep color (30/36/48 bit), the transmission of the desired illumination characteristic to each light source would require a considerably larger bandwidth because more information or data would need to be transmitted. As a result, the approach as applied in the present invention enables to apply a lower bandwidth to control a distributed light source. Alternatively, or in addition, the fact that a reduced amount of data needs to be transmitted to control the light sources, can be used to increase an update rate for the transmitted data. Phrased differently, the application of the present invention enables, for a given bandwidth (i.e. a maximum amount of data that can be transmitted per unit of time), to apply a desired transformation of the image at a much higher rate. This could e.g. lead to higher dynamics; i.e. more dynamic images or light shows. As an example of such a transformation, a mirroring or a translation or duplication of the image can be mentioned. By means of the present invention, such a transformation may thus be performed much faster or with more intermediate steps, such that a smoother, more continuous transformation is displayed.

Figure 3:
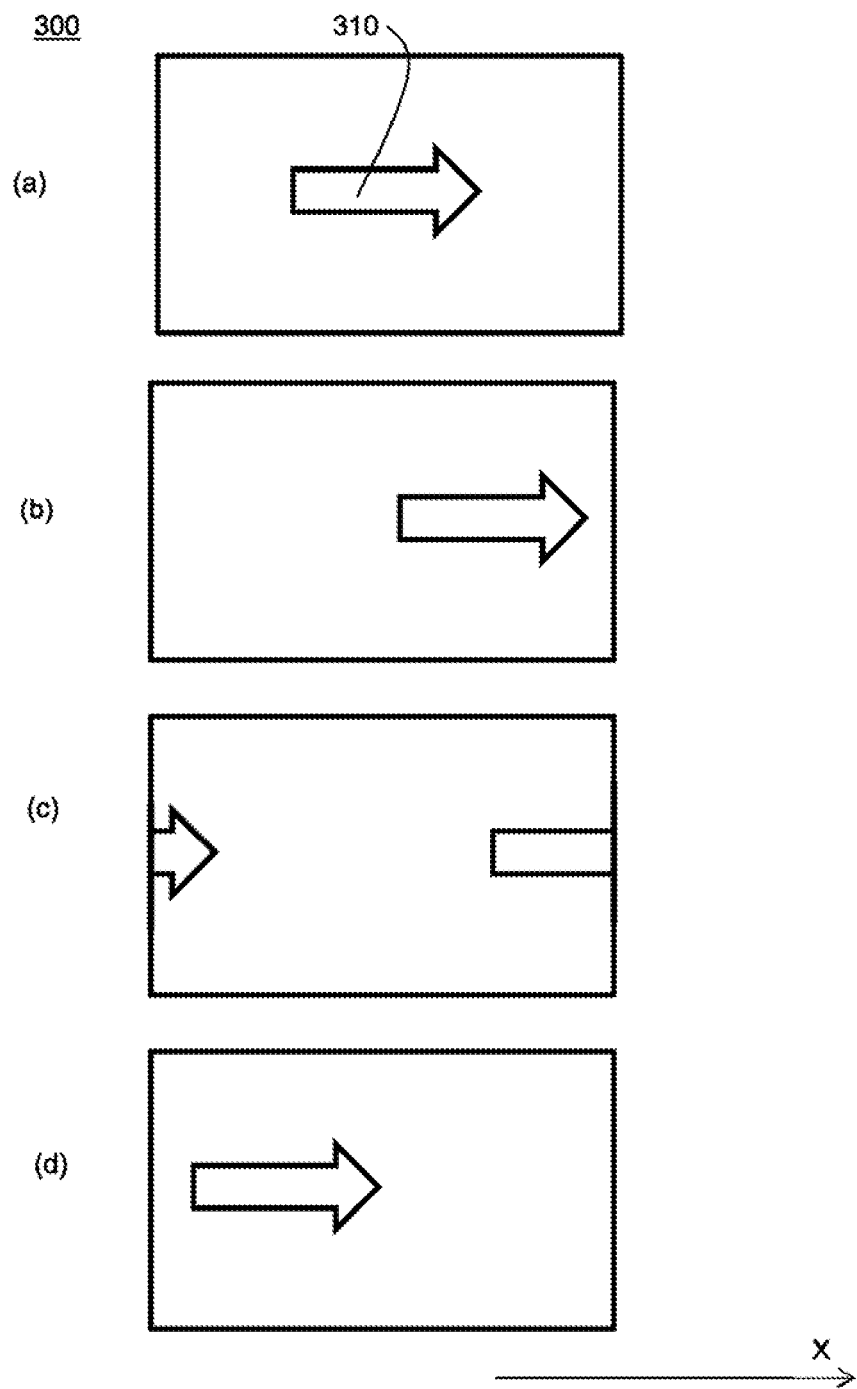
FIG. 3 depicts a sequence of images to be displayed.

This can be illustrated by the following example shown in FIG. 3:

Assuming that an image 300 of an arrow 310 is to be displayed, as e.g. shown in FIG. 3 (a)-(d), whereby the arrow is to be 'moved' to the right, i.e. along the horizontal direction X, with a predetermined speed. FIG. 3 (a)-(d) schematically shows a series of images that need to be displayed to achieve this effect. In order to achieve that the arrow 310 is perceived as moving in a substantially continuous manner, the image needs to be updated at a comparatively high rate. However, if such an update would require that each light source receives an updated illumination characteristic, the number of updates that can be performed may be severely limited by the available bandwidth. By uploading the image to all the light sources, a moving image may be generated with a much smaller bandwidth as only the coordinate pairs of the light sources, i.e. the position information of the light sources in the image, need to be updated. For the given example, one in fact only needs to update the horizontal coordinate of the coordinate pair. In particular, starting from the image as shown in FIG. 3 (a), the image can be moved to the right by an amount equal to the horizontal distance between two adjacent light sources by subtracting '1' from the horizontal coordinate of each light source of the distributed light source. Note that the horizontal coordinate of the light sources having '0' as horizontal coordinate, should be replaced by '127' in the above described example. Repeating this process thus enables to create an image of an arrow moving to the right, by merely updating the horizontal coordinate for each light source, this horizontal coordinate being indicate of the relative position (along the horizontal axis) of the particular light source in the image.

The process of translating the arrow as shown in FIG. 3 may further be generalized to translating an arbitrary image in any direction, e.g. letting it scroll in any direction. It can be pointed out that such a translation can also be realized by providing each of the light sources with only a portion of the image that needs to be displayed. In case the required translation of movement of the image is known in advance, one may determine which portion or part of the image is needed, i.e. is going to be used, for each of the light source. Referring to FIG. 3 and description, it will be clear to the skilled person that in order to move the image along a horizontal direction, it would be sufficient for a light source to know only the image data along said direction, i.e. having horizontal coordinates spanning the image in the horizontal direction and having a vertical coordinate corresponding to position of the light source in the image. When each light source is provided with image data along this direction, any desired translation of the image along said direction can be realized by simply providing the light source with a number representing the desired translation or shift of the image.

A further reduction of the required bandwidth, or an increase of the image update rate at a given (maximum) bandwidth, may be obtained by providing instructions that are not addressed to individual light sources but to groups of light sources or even to the entire distributed light source. With reference to the embodiment of FIG. 3, whereby an image is to be translated or moved to the right, it can be pointed out that the movement is realized by gradually reducing the horizontal coordinate of coordinate pair indicating the position of a light source. The same reduction is however applied to each of the light sources, when the entire image is to be translated. As such, rather than provide each of the light sources with an amended (i.e. reduced) horizontal coordinate, the plurality of light sources may be provided with an instruction to adjust their horizontal coordinate, and use the adjusted horizontal coordinate to look up the (new) desired illumination set point.

In an embodiment, such general instruction, i.e. an instruction that is valid for each of the light sources, can be transmitted or communication to each light source, e.g. sequentially. Alternatively, such a general instruction may also be broadcasted to all the light sources at once, thus further reduction the required amount of information or data that needs to be transmitted.

In such embodiment, a control unit of the distributed light source, e.g. control unit 220 as shown in FIG. 2, may then broadcast an instruction to each of the light source, the instruction containing information on how to obtain a new or next coordinate pair or, in general, how to obtain a new or next relative position of the light sources in the image.

In general, the present invention thus provides in two ways to transform an image to be displayed by a distributed light source.

Assuming that each of the light sources of the distributed light source is provided with the image to be displayed and has information about its relative position in the image, e.g. in an initial state.

A first way to modify the initial state, thereby modulating or transforming the image, is to provide the light sources of the distributed light source with information indicating a new relative position of each light source in the image. A modification of the image may then be realized by the light sources by using the received new relative position to determine the new illumination set point to be applied.

A second way to modify the initial state is to provide the light sources with information or instructions how to arrive at a new relative position, rather than providing each light source with its new relative position.

The second way of transforming an image may be advantageous in case the proposed transformation is the same for all light sources. In such case, the required instruction can be broadcasted to all light sources, rather than individually addressing each light source with a new relative position.

Apart from rotations or translations, the present invention may further enable other transformations of an image to be displayed. In particular, with reference to FIG. 3, the arrow can be made to translate in the vertical direction or even to rotate. Further, the arrow may be resized, e.g. made smaller or larger, when desired.

Using the present method for displaying an image, various other effects may be realized, requiring a comparatively low bandwidth.

As an example, multiple images or multiple parts or portions of images may be transmitted and stored in the plurality of light sources of the distributed light source. In such embodiment, multiple images may be superimposed onto one another or added. As an example, a first image may e.g. represent a landscape, whereas the second image represents a number of stars. The images may be superimposed resulting in an image of a landscape with stars. Transformations of the images may be applied as discussed above, e.g. a translation of the second image that is superimposed on the first image, without requiring the transmission of a large amount of data. Commands instructing the distributed light source to apply a particular subset of images available may e.g. be broadcasted to the plurality of light sources all at once. As another example, when an image as shown in FIG. 1 is uploaded and stored in each of the light sources of a distributed light source, a duplication of such an image can be easily realized. To illustrate this, one can assume that the image of FIG. 1 is provided to the plurality of light sources.

Figure 4:
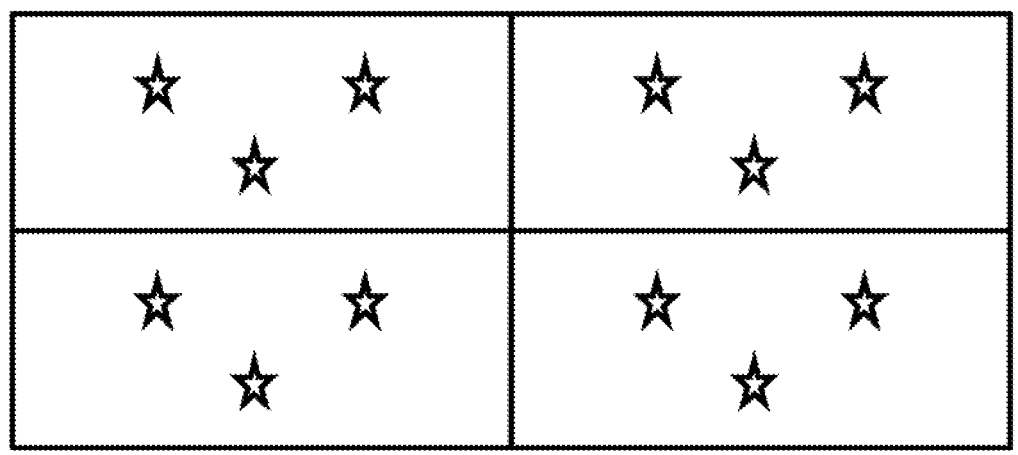
FIG. 4 depicts an image to be displayed, the image comprising 4 partial images.

Further, assuming that the image to be displayed is the image 400 shown in FIG. 4, i.e. an image consisting of 4 partial images, each partial image corresponding to the image 100 of FIG. 1. In case the image is characterized, as indicated above, by a 128×128 matrix of illumination values, I(i, j), e.g. comprising a color and intensity set point and assuming that the distributed light source comprises 128×128 light sources L(k, l) arranged in a matrix, the image as shown in FIG. 4 can be realized by providing the light sources L with the following relative positions or coordinate pairs:

For k, l=0-63;
  L(k, l)→I(k*2, l*2);
  L(k+64, l)→I(k*2+64, l*2);
  L(k+64, l+64)→I(k*2+64, l*2+64);
  L(k, l+64)→I(k*2, l*2+64);

Using these coordinate pairs and the uploaded image, each of the light source may then determine the desired illumination value and by applying these values, the image 100 of FIG. 1 is shown 4 times, in accordance with the image 400 of FIG. 4.

Using similar transformations as described above, one may e.g. also enlarge a portion of the image by using the distributed light source to only display the portion of the image. Note that in such case, the coordinates indicating the position of the light sources may need to be rounded to the nearest integer. As will be understood, this may affect the resolution with which the enlarged image will be displayed. In general, it may further be noted that the number of illumination values I(i, j) describing the image need not correspond to the number of available light sources L(k, l) of the distributed light source. In particular, the image to be displayed may be specified with a higher number of illumination values or with a lower number of illumination values than the available number of light sources in the distributed light source. In such cases, there may not be a one-to-one correspondence between an illumination value I(i, j) and a light source L(k, j). In such cases, various different approaches may be applied in order to arrive at the desired illumination characteristic or value for each of the light sources.

Figure 5:
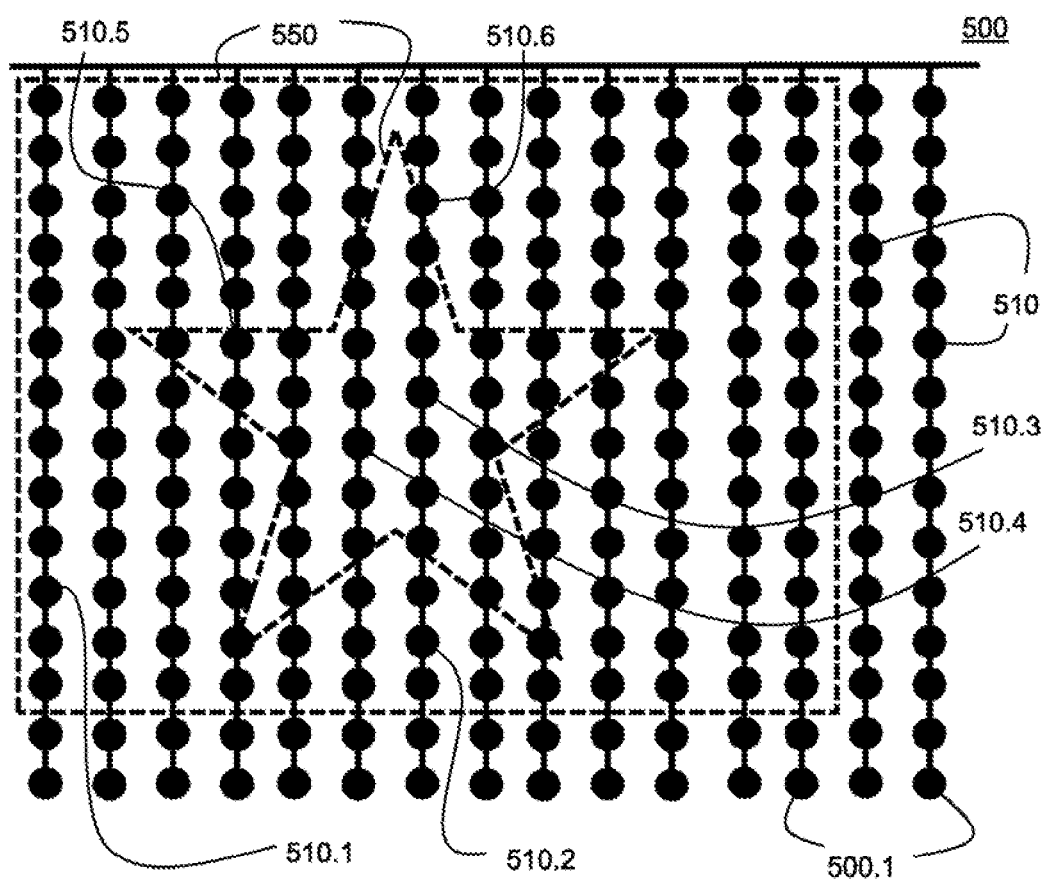
FIG. 5 depicts an image to be displayed mapped on a distributed light source.

In general, the illumination characteristics as outputted by the plurality of light sources of the distributed light source should be such that the image is displayed as accurate as possible. In an embodiment, a mapping or projection of the image that is to be displayed onto the distributed light source may be applied, in order to determine a desired illumination characteristic of the light sources. Such a mapping provides, as will be explained further on, a second example of providing information indicative of a relative position of the plurality of light sources in the image. FIG. 5 schematically illustrates such mapping. FIG. 5 schematically shows a distributed light source 500, similar to the light source 200 of FIG. 2. The distributed light source 500 comprising a plurality of light sources 510. In the embodiment as shown, the distributed light source 500 comprises a plurality of vertical strings 500.1 arranged adjacent each other in a horizontal direction, each string comprising a plurality of light sources 510. Such a light source may e.g. be mounted to a wall of a building. FIG. 5 further shows, in dotted line, an image 550 that is to be displayed by the light source, the image 550 may e.g. be assumed to be the image of a star having a first, uniform, color on a background having a second, uniform, color. As shown, the image 550 is superimposed or mapped onto the locations of the light sources of the distributed light source 500. In order to realize such a mapping, use can be made of available positional data about the location of the various light sources and positional data about the desired size and location of the image that is to be displayed. Starting from an image that is characterized by a 2D array of illumination values I(i, j) and a known position or location where the image needs to be displayed, one may associate a desired position or location to each illumination value. Such positional image data may thus indicate which illumination value is required at which location or position, i.e. such data indicates a desired position of the image. This positional image data may then be mapped to the location or position of the plurality of light sources of the distributed light source. Based on such mapping, one may then determine the required illumination characteristic of each of the light sources. Referring to FIG. 5, the mapping of the desired image 550 onto the distributed light source 500 enables to e.g. determine the desired color of light sources 510.1 and 510.2 as the second color, i.e. the background color, and the desired color of the light sources 510.3 and 510.4 as the first color. In order to determine the required or desired illumination characteristic for light sources that are located on or near transitions between the background and the start shape, e.g. light sources 510.5 and 510.6, various options exist.

As a first example, the illumination characteristic of such light sources may be equated to the illumination value I(i, j) that is closest to it. Using the above described positional image data, one may determine, based on the actual position of a light source, the closest illumination value and apply this value.

As a second example, the illumination characteristic of such light sources may be determined based on two or more required illumination values I(i, j) in its vicinity. Using the above described positional image data, one may determine, based on the actual position of a light source, the desired illumination values in its vicinity and apply a weighing of these values to arrive at a desired illumination characteristic for the light source. As an example of such weighing, an averaging of the illumination values in its vicinity may be mentioned. Such an averaging may also be referred to as an interpolation to arrive at an illumination characteristic for a light source, based on desired illumination characteristics in its vicinity.

As described above, the operating method according to the present invention enables to display images or moving images with a reduced bandwidth, by transmitting and storing a part or portion of the image in each of the plurality of light sources. As mentioned, such image data may comprise illumination set-points, e.g. arranged in an image coordinate system, whereby each illumination set-point comprises an intensity set-point and a color set-point. In an alternative method, the illumination set-point as used to describe the image only comprises a color set-point. In such embodiment, the distributed light source may e.g. apply a default intensity set-point when generating the color set-point. Such default intensity may e.g. be associated with a nominal current as generated by an LED driver or LED drivers as applied to power the plurality of light sources.

As an alternative to merely providing, as illumination set-points, color set-points to represent the image that is to be displayed, the illumination set-points may comprise, in addition to a color set-point, a relative intensity set-point indicate of a relative intensity for the light sources. The relative intensity to be applied by each of the light sources to display an image may e.g. be expressed in a range from 0 to 100%. In such embodiments, the method may further comprise the step of providing, to the plurality of light sources, a desired global intensity level. Such global intensity level may e.g. be broadcasted to the distributed light source; i.e. this global intensity level can be the same for all light sources. So, no individual addressing is required. Such a global intensity level may e.g. be expressed as a current value associated with a particular relative intensity or may be expressed as a percentage of the maximum intensity that can be realized. Upon receipt of this global intensity level, each of the light sources may determine its required intensity set-point based on this global intensity level and its relative intensity set-point.

Figure 6:
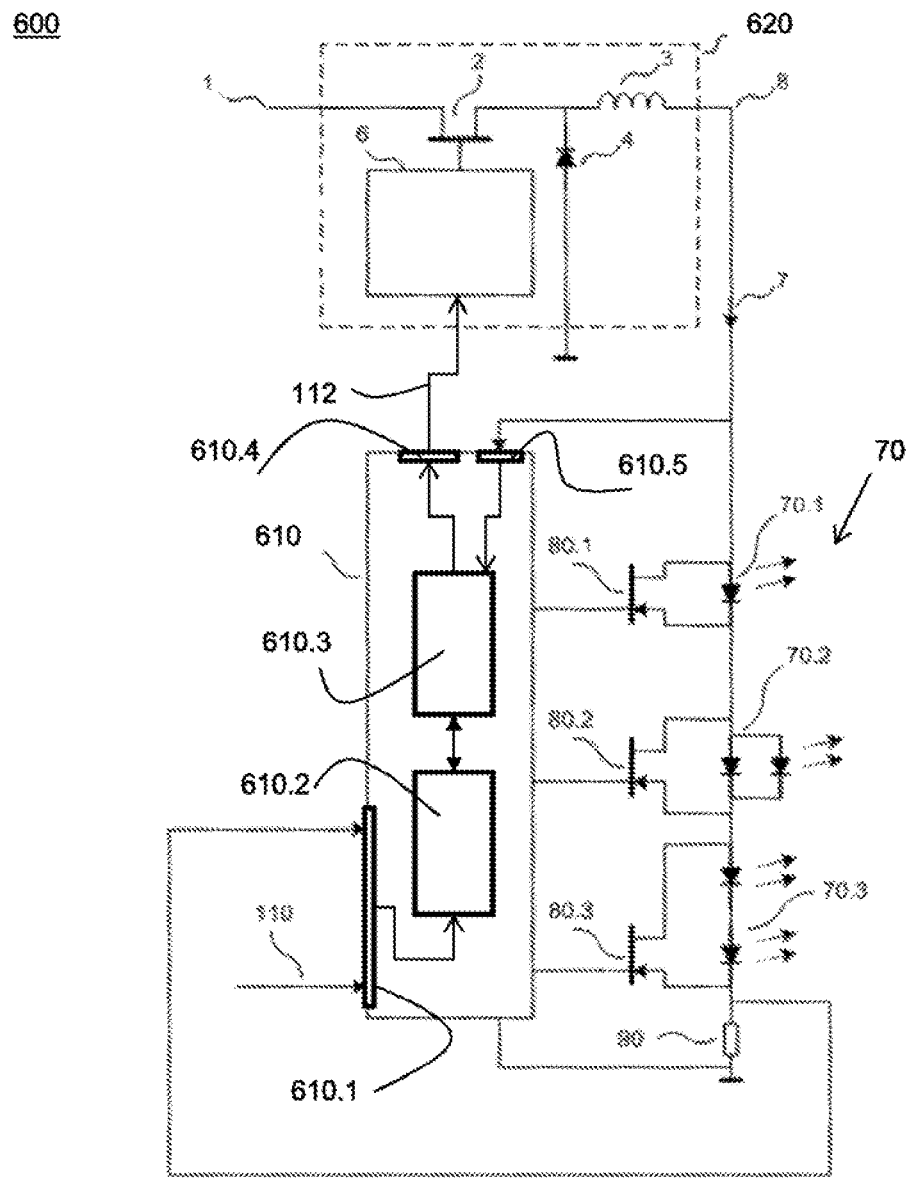
FIG. 6 depicts a light source as can be applied in a distributed light source according to the present invention.

In order to realize the imaging processes according to the present invention, the present invention further provides in a distributed light source, the light source comprising a plurality of light sources, each of the light sources being provided with a memory unit or memory module for storing an image to be displayed. FIG. 6 schematically shows an embodiment of a light source as can be applied in the distributed light source according to the present invention. FIG. 6 schematically depicts a light source 600 comprising a light source control unit 610 arranged to control a power supply 620, i.e. a switched mode power supply 620 and an LED assembly 70, the LED assembly comprising three LED units 70.1, 70.2 and 70.3. The LED assembly further comprises switches (e.g. MOSFET's) 80.1, 80.2 and 80.3 associated with each LED unit for controlling the current per LED unit.

In order to provide a desired illumination characteristic of the light source, each of the LED units can be driven at a certain duty cycle. In the embodiment as shown, the light source control unit 610 is arranged to receive, at an input terminal 610.1 of the control unit, an input signal 110. Such an input signal 110 may e.g. comprise the aforementioned image data that is to be transmitted to the plurality of light sources of the distributed light source, i.e. an image or part of an image to be transmitted and/or position information regarding the position of the light source in the image. In the embodiment as shown, the light source control unit 610 further comprises a memory unit or module 610.2 and a processing unit or module 610.3. In accordance with an embodiment of the present invention, the memory unit 610.2 may e.g. be used for storage of an image to be displayed, the image e.g. received via the input terminal 610.1. The processing unit 610.3 of the light source 600 may e.g. be configured to determine one or more control signals for controlling the power converter 620 and or the LED assembly, in particular the switches 80.1-80.3 of the LED assembly, thereby controlling the illumination characteristic of the light source 600, e.g. in accordance with the desired illumination characteristic. In accordance with the present invention, this desired illumination characteristic may e.g. be determined by the processing unit 610.3 of the light source control unit 610, based on the received image and received relative position information. In the embodiment as shown, the processing unit 610.3 is configured to output, via output terminal 610.4, a control signal 112 to the power converter 620, in particular to the controller 6 of the power converter 620. In the embodiment as shown, the power converter 620 is a Buck converter and comprises a switching element 2, an inductance 3 and a diode 4. A controller 6 controls the switching of the switching element 2, e.g. based on an input signal 112 of the light source control unit 610. A voltage over the resistance 90 of the LED assembly 70 can e.g. be applied as a feedback for the actual current 7 provided by the power converter 620. Designated by reference number 1 is the supply voltage of the power converter (e.g. 48 or 60 V), designated by reference number 8 is the output voltage of the power supply which substantially corresponds to the sum of the voltages over the multiple LED units, also referred to as the forward voltage over the LED units. In the embodiment as shown, the forward voltage 8 is also provided to the input terminal 610.5 of the control unit 610, said forward voltage 8 may e.g. be applied by the processing unit 610.3 to determine control signals for controlling the power converter 620 and or the LED assembly 70.

In accordance with an embodiment of the present invention, there is provided a distributed light source comprising a plurality of light sources such as the light sources 600 as shown in FIG. 6. Such distributed light source according to the present invention further comprises a control unit, referred to as a central control unit or master control unit, capable of transmitting information or instructions to the plurality of light sources of the distributed light source, in particular to the light source control units of the plurality of light sources. Within the meaning of the present invention, such transmission of information or instructions may be realized by any communication method, including wireless or wired communication methods. In an embodiment, the control unit of the distributed light source according to the present invention is configured to control the plurality of the light sources to perform the operating methods according to the present invention.

As already indicated above, the present invention may further be applied to distributed light sources whereby a relative position of the light sources can vary over time. Examples of such arrangements include a plurality of drones or a crowd of people provided with light sources. Such light sources may e.g. include smartphones or the like. In case of such a distributed light source, i.e. a light source of which the locations of the plurality of light sources varies, the plurality of light sources may be configured to provide location information to the control unit of the distributed light source. Such location information may e.g. include GPS coordinates or the like.

In such an embodiment, the plurality of light sources may be configured to transmit, at a predetermined rate, their position to the control unit of the distributed light source, enabling the control unit to re-assess the relative positions of the light sources and provide the light sources with updated information on their relative position in the image.

In an embodiment, the light sources as applied in the distributed light source according to the present invention are LED based light sources. Such light sources may e.g. comprise one or more LEDs e.g. an LED group, comprising LEDs of different colors. Such light sources may further comprise a power converter such as an LED driver, configured to provide an appropriate current to the LED or LEDs, i.e. a current required to realize the desired illumination characteristic or set-point.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A method of operating a distributed light source comprising a plurality of individually controllable light sources arranged in a single grid to display a moving image, the method comprising the steps of:
    transmitting, by a central controller, an entire image of the moving image to be displayed in the single grid, wherein the transmitted image to each of the plurality of light sources of the distributed light source includes illumination data of the entire image to be displayed within the single grid of the plurality of light sources using an image coordinate system, the image coordinate system being a matrix, wherein each matrix element of the matrix comprises a coordinate set whereby each coordinate of the coordinate set indicates a desired illumination characteristic representing an intensity and a color to be generated at a particular location in the image by the respective light source of the plurality of individually controllable light sources, wherein each of the plurality of light sources receives only coordinates of the image coordinate system that are used by the respective light source for illumination of the moving image;
    storing, by each of the plurality of light sources, at least a portion of the received image;
    providing, to each of the plurality of light sources, position information including coordinates within the image coordinate system that are indicative of a position of the respective light source in the portion of the image using the image coordinate system;
    determining, by each of the light sources, an illumination set point for the respective light source, based on the position information and the stored coordinate set of the portion of the image;
    controlling the plurality of light sources to generate an illumination to display the image based upon only the coordinates that are indicative of the position of the respective light sources having the plurality of illumination set points; and
    after displaying the image, displaying a next image of the moving image by:
        providing to each of the light sources next position information including only a portion of the coordinate set of the specific light source indicative of a change in a next position of illumination for the light source in a direction of movement in the image such that the next position information is not provided to a light source having no change in coordinates in the direction of movement;
        determining, by each of the light sources, a next illumination set point for the light source, based on the next position information; and
        controlling the plurality of light sources to generate an updated illumination in the direction of movement of the image in accordance with the respective plurality of next illumination set points, thereby displaying the next image of the moving image using a smaller bandwidth of data containing only the position information of the light sources having a change in coordinate in the direction of movement of the image.

2. The method according to claim 1, wherein the step of providing, to each of the plurality of light sources, position information indicative of a position of the respective light source in the portion of the image using the image coordinate system is preceded by the step of determining the position information for the plurality of light sources based on a relative or absolute position of the plurality of light sources in a light source coordinate system.

3. The method according to claim 1, wherein the next position information indicates a displacement of the position of the light source to the next position in the image coordinate system.

4. The method according to claim 1, wherein the illumination set point represents an intensity set point and a color set point as a function of the coordinates in the image coordinate system.

5. The method according to claim 1, wherein the image has a higher resolution than the distributed light source.

6. The method according to claim 1, wherein the step of providing to each of the light sources position information indicative of a position of the light source in the image coordinate system comprises providing a coordinate set to each of the light sources.

7. The method according to claim 1, wherein the step of providing to each of the light sources position information indicative of a relative position of the light source in the image comprises a mapping of the image onto a position of the distributed light source.

8. The method according to claim 7, wherein the step of mapping the image onto a position of the distributed light source comprises:
    determining positional image data indicating a desired position of the image, and
    mapping the positional image data to positions of the plurality of light sources of the distributed light source.

9. A distributed light source comprising:
    a plurality of light sources,
    the distributed light source being configured to execute the method according to claim 1.

10. The method according to claim 1, wherein the position information is indicative of a position of a part in the portion of the image of which the desired illumination characteristic is to be generated by the respective light source using the image coordinate system.

11. The method according to claim 1, wherein the position information is indicative of a position of a dot or a pixel or a point in the portion of the image of which the desired illumination characteristic is to be generated by the respective light source using the image coordinate system.

12. A distributed light source configured to display a moving image, the distributed light source comprising:
   a central controller; and
   a plurality of individually controllable light sources arranged in a single grid for display of the moving image, each of the plurality of light sources comprises:
      an LED assembly comprising one or more LEDs;
      a power converter configured to power the LED fixture; and
      a light source controller comprising a memory and a processor, the light source controller being configured to:
         receive, directly from the central controller, an image signal representing an image of the moving image to be displayed in the single grid, wherein the received image signal includes illumination data of the entire image to be displayed within the single grid of the plurality of light sources using an image coordinate system, the image coordinate system being a matrix, wherein each matrix element of the matrix comprises a coordinate set whereby each coordinate of the coordinate set indicates a desired illumination characteristic representing an intensity and a color to be generated at a particular location in the image by the respective light source of the plurality of individual controllable light sources, wherein each of the plurality of light sources receives only coordinates of the image coordinate system that are used by the respective light source for illumination of the moving image, and store at least a portion of the received image signal in the memory;
         receive, from the central controller, position information including coordinates within the image coordinate system that are indicative of a position of the respective light source in the portion of the image to be displayed;
         determine an illumination set point for the respective light source, based on the position information and the stored coordinate set of the portion of the image;
         control the respective light source to generate an illumination and display the image based upon only the coordinates that are indicative of the position of the respective light source having the illumination set point; and
         after displaying the image, display a next image of the moving image by:
            providing to each of the light sources next position information including only a portion of the coordinate set of the specific light source indicative of a change in a next position of illumination for the light source in a direction of movement in the image such that the next position information is not provided to a light source having no change in coordinates in the direction of movement;
            determining, by each of the light sources, a next illumination set point for the light source, based on the next position information; and
            controlling the plurality of light sources to generate an updated illumination in the direction of movement of the image in accordance with the respective plurality of next illumination set points, thereby displaying the next image of the moving image using a smaller bandwidth of data containing only the position information of the light sources having a change in coordinates in the direction of movement of the image.

13. The distributed light source according to claim 12, wherein the central controller is configured to determine the position information for the plurality of light sources based on a relative or absolute position of the plurality of light sources in a light source coordinate system.

14. The distributed light source according to claim 12, wherein the processor is configured to determine the illumination set point for the respective light source and determine one or more control signals to control the respective light source.

15. The distributed light source of claim 12, wherein the position information is indicative of a position of a part in the portion of the image of which the desired illumination characteristic is to be generated by the respective light source using the image coordinate system.

16. The distributed light source of claim 12, wherein the position information is indicative of a position of a dot or a pixel or a point in the portion of the image of which the desired illumination characteristic is to be generated by the respective light source using the image coordinate system.

17. A method of operating a distributed light source comprising a plurality of individually controllable light sources arranged in a single grid to display a sequence of images, the method comprising the steps of:
   transmitting, by a central controller, the sequence of images to be displayed in the single grid, wherein the transmitted sequence of images to each of the plurality of light sources of the distributed light source includes illumination data of an entire image to be displayed within the single grid of the plurality of light sources using an coordinate system, the image coordinate system being a matrix, wherein each matrix element of the matrix comprises a coordinate set whereby each coordinate of the coordinate set includes a desired illumination characteristic representing an intensity and a color to be generated at a particular location in the image by the respective light source of the plurality of individually controllable light sources, wherein each of the plurality of light sources receives only coordinates of the image coordinate system that are used by the respective light source for illumination of the sequence of images;
   storing, by each of the plurality of light sources, at least a portion of the received sequence of images;
   providing, to each of the plurality of light sources, position information including coordinates within the image coordinate system that are indicative of a position of the respective light source in the portion of the sequence of images, using the image coordinate system, during a displaying of the sequence of images;
   determining, by each of the light sources, an illumination set point for the respective light source for the sequence of images, based on the position information and the stored coordinate set of the portion of the image;
   controlling the plurality of light sources to generate an illumination to display the image based upon the coordinates that are indicative of the position of the respective light sources having the plurality of illumination set points; and
   displaying a next image of the sequence of images by:
      providing to each of the light sources next position information including only a position of the coordinate set of the specific light source indicative of a change in a next position of illumination for the light source in a direction of movement in the image such that the next position information is not provided to a light source having no change in coordinates in the direction of movement;

determining, by each of the light sources, a next illumination set point for the light source, based on the next position information; and controlling the plurality of light sources to generate an updated illumination in the direction of movement of the image in accordance with the respective plurality of next illumination set points, thereby displaying the next image of the sequence of images using a smaller bandwidth of data containing only the position information of the light sources having a change in coordinate in the direction of movement of the image.

18. The method of claim 17, wherein the position information is indicative of a position of a part in the portion of the image of which the desired illumination characteristic is to be generated by the respective light source using the image coordinate system.

19. The method of claim 17, wherein the position information is indicative of a position of a dot or a pixel or a point in the portion of the image of which the desired illumination characteristic is to be generated by the respective light source using the image coordinate system.

* * * * *